United States Patent Office

3,649,560
Patented Mar. 14, 1972

3,649,560
OXIDATIVE DEHYDROGENATION CATALYSTS
Louis J. Croce, Seabrook, Tex., and Laimonis Bajars, Princeton, N.J., assignors to Petro-Tex Chemical Corporation, Houston, Tex.
No Drawing. Original application Mar. 28, 1968, Ser. No. 716,986, now Patent No. 3,607,966, dated Sept. 21, 1971. Divided and this application Sept. 14, 1970, Ser. No. 72,188
Int. Cl. B01j 11/82
U.S. Cl. 252—432                   2 Claims

ABSTRACT OF THE DISCLOSURE

Compositions of matter comprising ferrites of magnesium, manganese, cobalt, nickel, zinc or cadmium modified with boron and a process of oxidative dehydrogenation by feeding oxygen to a reactor containing these compositions.

RELATED APPLICATIONS

This is a divisional of application Ser. No. 716,986, filed Mar. 28, 1968 and new Pat. No. 3,607,966.

BACKGROUND OF THE INVENTION (1) Field of the invention

This application relates to the dehydrogenation of organic compounds in vapor phase by a process wherein dehydrogenation is accomplished by reacting oxygen with hydrogen from an organic compound in order to dehydrogenate the compound.

(2) Description of the prior art

It is known to oxidatively dehydrogenate organic compounds by contacting the organic compound at an elevated temperature with oxygen in the presence of ferrite compositions such as disclosed in United States Pats. 3,270,080; U.S. 3,303,234; U.S. 3,303,235; U.S. 3,303,236 and U.S. 3,303,238. U.S. Patent 3,320,330 discloses the process of oxidative dehydrogenation in the presence of a catalyst of bismuth, molybdenum and optionally phosphorus, promoted by oxides of boron and bismuth.

SUMMARY OF THE INVENTION

This invention relates to compositions of matter comprising ferrites of magnesium, manganese, cobalt, nickel, zinc, cadmium or mixtures thereof with boron. This invention also relates to a process where these compositions are used as catalysts in an oxidative dehydrogenation process where oxygen is fed to a reactor containing the compositions as catalysts.

DESCRIPTION OF PREFERRED EMBODIMENTS

Objects of this invention are to provide improved compositions of matter and particularly to provide compositions which are useful as catalysts in a process of oxidative dehydrogenation wherein the catalyst produces high conversions, selectivities, yields and has improved catalyst life and physical stability and wherein the catalyst is compatible with substantial quantities of steam.

These and other objectives of the process of this invention are achieved by feeding oxygen or an oxygen containing gas together with the compound to be dehydrogenated to a reactor containing a catalyst comprising a ferrite of at least one metal selected from the group consisting of magnesium, manganese, cobalt, nickel, zinc, cadmium or mixtures thereof, hereinafter referred to as the designated metal or as Me. The composition is modified with boron.

Excellent results have been obtained when the composition has in the surface at least 50 or preferably at least 70 atomic weight percent of the designated metal in the form of a ferrite. Also excellent results have been obtained when the composition has in the surface from 10 to 98 atomic weight percent of the iron present as ferrite and from 90 to 2 atomic weight percent of the iron being present as iron oxide, with a preferred range being from 40 to 95 atomic weight percent as ferrite and 60 to 5 percent as iron oxide. The designated metal(s) in the oxidant surface generally will be present in an amount of from or about .2 to 2.0 atoms of Me per atom of iron with a preferred range being from .25 to 1.0 atoms with excellent results being obtained at a ratio of about 0.5 atom of Me per atom of iron.

According to this invention it has been found that the preferred compositions exhibit a certain type of X-ray diffraction pattern. The preferred compositions do not have as sharp X-ray diffraction reflection peaks as would be found, e.g., in a high crystalline material having the same chemical composition. Instead, the preferred compositions of this invention exhibit reflection peaks which are relatively broad. The degree of sharpness of the reflection peak may be measured by the reflection peak band width at half weight (Wh/2). In other words, the width of the reflection peak as measured at one-half of the distance to the top of the peak is the "band width at half height." The band width at half height is measured in units of ° 2 theta. Techniques for measuring the band widths are discussed, e.g., in Chapter 9 of Klug and Alexander, X-ray Diffraction Procedures, John Wiley and Son, N.Y., 1954. The observed band widths at half height of the preferred compositions of this invention are at least 0.16 ° 2 theta and normally will be at least 0.20 ° 2 theta.[1] For instance, excellent compositions have been made with band widths at half height of at least 0.22 or 0.23 ° 2 theta. The particular reflection peak used to measure the band width at one-half height is the reflection peak having Miller (hkl) indices of 220. (See, e.g., Chapter of Klug and Alexander, ibid). Applicants do not wish to be limited to any theory of the invention in regard to the relationship between composition activity and band width.

Suitable preferred ferrites to be modified with boron according to this invention are zinc ferrites having X-ray diffraction peaks within the d-spacings 4.83 to 4.89, 2.95 3.01, 2.51 to 2.57, 2.40 to 2.46, 2.08 to 2.14, 1.69 to 1.75, 1.59 to 1.65 and 1.46 to 1.52, with the most intense peak being between 2.95 to 3.01; manganese ferrite having peaks at d spacings within or about 4.87 to 4.93, 2.97 to 3.03, 2.50 to 2.58, 2.09 to 2.15, 1.70 to 1.76, 1.61 to 1.67 and 1.47 to 1.53, (with other peaks) with the most intense peak being between 2.52 to 2.58; magnesium ferrites having peaks between 4.80 to 4.86, 2.93 to 2.99, 2.49 to 2.55, 2.06 to 2.12, 1.68 to 1.73, 1.58 to 1.63 and 1.45 to 1.50 with the most intense peak being between 2.49 and 2.55; and nickel ferrites having peaks within the d spacings of 4.79 to 4.85, 2.92 to 2.98, 2.48 to 2.54, 2.05 to 2.11, 1.57 to 1.63 and 1.44 to 1.49, with the most intense peak being within 2.48 to 2.54. The zinc ferrites will generally have peaks within the d-spacings 4.84 to 4.88, 2.96 to 3.00, 2.52 to 2.56, 2.41 to 2.45, 2.09 to 2.13, 1.70 to 1.74,

---

[1] The powder diffraction patterns may be made, e.g., with a Norelco constant potential diffraction unit type No. 12215/0 equipped with a wide range goniometer type No. 42273/0, cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1660 volts and the pulse height analyzer is set to accept pulses with amplitudes between 10 and 30 volts only. Slits used are divergence 1°, receiving .006 inch and scatter 1°. Strip chart recordings for identification are made with a scanning speed of ¼° per minute, time constant of 4 seconds and a full scale at 10³ counts per second. No correction is made for K$^\alpha$ doublet or instrumental broadening of the band widths.

1.60 to 1.64 and 1.47 to 1.51. Similarly, the magnesium ferrites will generally have peaks within the d-spacing of 4.81 to 4.85, 2.93 to 2.98, 2.50 to 2.54, 2.07 to 2.11, 1.69 to 1.72, 1.59 to 1.62 and 1.46 to 1.49, with the most intense peak being within the range of 2.50 to 2.54. The nickel ferrites will generally have peaks within the d-spacings 4.80 to 4.84, 2.93 to 2.97, 2.50 to 2.53, 2.07 to 2.10, 1.59 to 1.61 and 1.46 to 1.49, with the most intense peaks being within 2.50 to 2.53. The preferred ferrites are those where Me is Mn, Mg, Zn and mixtures thereof.

Ferrite formation may be accomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, manganese carbonate may be reacted with iron oxide hydrates to form manganese ferrite. Desired ferrites may be obtained by conducting the reaction to form the ferrite at relatively low temperatures, that is, at temperatures lower than some of the very high temperatures used for the formation of some of the semiconductor applications. Good results, e.g., have been obtained by heating the ingredients to a temperature high enough to produce the required ferrite but at conditions no more severe than equivalent to heating at 950° C. or 1000° C. for 90 minutes in air and generally the maximum temperature will be less than 1300° C. and preferably less than 1150° C.

In the composition surface the boron will generally be present in an amount from .002 to 0.3 atom per atom of iron with a preferred range being from .02 to .20 atom per atom of iron.

The compositions of this invention may also comprise additives. Phosphorus, silicon or mixtures thereof are examples of additives. Excellent results are obtained with phosphorus and/or silicon present in an amount of from or about 0.2 to 20 weight percent, based on the total weight of the atoms of iron and the designated metal. These ingredients may contribute, e.g., to the stability of the oxidants, and there is some indication of synergistic results being obtained with the boron. Excellent oxidants may contain less than 5 weight percent, and preferably less than 2 weight percent, of sodium or potassium in the surface of the oxidant. Other additives may be present. Also unreacted precursors may be present.

The boron, silicon, phosphorus, or other additives may be added at various stages of the oxidant preparation. The boron may be added in a variety of ways such as by the use of a solution, dispersion or suspension of a boron compound. One prefererd method is to mix the dry ingredients including the pre-formed ferrite, other than the boron, with a boron compound such as boric acid. The boron may also be incorporated during ferrite formation. Any suitable boron compound may be employed such as $B_2O_3$, $H_3BO_3$, $H_2B_4O_7$, BP, ammonium tetraborate and the like. If phosphorus or silicon is employed, there may be added such as by the use of any of the phosphoric acids, phosphorus pentoxide, ethyl phosphate, amine phosphate, ammonium phosphate, phosphorus halides, phosphorus oxyhalides, silicon halides and so forth. Silica may be incorporated in the oxidant, for example, by the acid hydrolysis of an organic or inorganic silicate, such as tetraethyl ortho silicate. The boron should suitably be present in an intimate combination with the other ingredients of the oxidant. These additives may or may not be combined chemically, intimately mixed, in solid solution with the other ingredients, and so forth.

Although determinations regarding the mechanism of reaction are difficult, the process of this invention is an oxidative dehydrogenation process wherein the predominant mechanism of dehydrogenation is by the reaction of oxygen with hydrogen and preferably at least 85 or 90 mol percent of the hydrogen atoms removed are by this reaction.

Carriers or supports for the oxidant may be employed such as alumina, pumice, silica and so forth. Diluents and binders may also be used. Unless stated otherwise, the referred-to compositions in this application are the main active constituents of the dehydrogenation process during dehydrogenation and any ratios and percentages refer to the surface of the catalyst in contact with the gaseous phase during dehydrogenation.

The compositions may be reduced with a reducing gas, e.g., such as hydrogen or hydrocarbons. For example, the preformed compositions may be reduced with e.g. hydrogen at a temperature of at least 350° C. with the temperature of reduction generally being no greater than 850° C. The period of time for reduction will be dependent somewhat upon the temperature of reduction but ordinarily will be at least 30 minutes. By reducing gas is meant a gas that will react with oxygen of the composition under the conditions of reduction.

When employing the composition in this process excellent results have been obtained. For example, the composition exhibits relatively little time trend compared to other compositions. Further it has been found that the composition has desirable adsorption characteristics in regard to both oxygen, organic compounds and inert gases. The composition results in dehydrogenations at high selectivity and yield. Moreover, the composition is not sensitive to steam and steam may be advantageously employed during dehydrogenation such as in an amount of at least 2 mols per mol of organic compound to be dehydrogenated. A further advantage of the oxidant is that it is resistant to attrition and physical or chemical disintegration.

The process of this invention may be applied to the dehydrogenation of a wide variety of organic compounds. Such compounds normally will contain from 2 to 20 carbon atoms, at least one

grouping, a boiling point below about 350° C., and such compounds may contain other elements, in addition to carbon and hydrogen such as oxygen, halogens, nitrogen and sulphur. Preferred are compounds having from 2 to 12 carbon atoms, and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2 chlorobutene-1 or 2,3 dichlorobutane to chloroprene, ethyl pyridine to vinyl pyridine, ethylbenzene to styrene, isopropylbenzene to α-methyl styrene, ethylcyclohexane to styrene, cyclohexane to benzene, methane to ethylene and acetylene, ethane to ethylene to acetylene, propane to propylene or methyl acetylene, allene, or benzene, isobutane to isobutylene, n-butane to butene and butadiene-1,3, butene to butadiene-1,3 and vinyl acetylene, methyl butene to isoprene, cyclopentane to cyclopentene and cyclopentadiene-1,3, n-octane to ethyl benzene and ortho-xylene, monomethylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3 dichlorobutane, 1,4 dichlorobutane, the chlorofluoroethanes, methyl pentane, methylethyl ketone, diethyl ketone, n-butyl alcohol, methyl propionate, and the like.

Suitable dehydrogenation reactions are the following: acylic compounds having 4 to 5 non-quarternary contiguous carbon atoms to the corresponding olefins, diolefins or acetylenes having the same number of carbon atoms; aliphatic hydrocarbons having 6 to 16 carbon atoms and at least one quarternary carbon atom to aromatic compounds, such as 2,4,4-trimethylpentene-1 to a mixture of xylenes; acyclic compounds having 6 to 16 carbon atoms and no quarternary carbon atoms to aromatic compounds such as n-hexane or the n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be dehydrogenated are hydrocarbons with a particularly preferred class being acyclic non-quarternary hydrocarbons having 4 to 5 contiguous carbon atoms or ethyl benzene and the preferred products are n-butene-1 or 2, butadiene-1,3, vinyl acetylene, 2-methyl-1-butene, 3-methyl-1-butene, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent.

Diluents or stripping agents such as nitrogen, helium, or other gases may be fed to the process at any point. Mixtures of diluents may be employed. Volatile compounds which are not dehydrogenated or which are dehydrogenated only to a limited extent may be present as diluents.

It is one of the advantages of this process that during dehydrogenation the reaction mixture may contain steam. When steam is employed during dehydrogenation, the range will generally be between about 2 and 40 mols of steam per mol of organic compound to be dehydrogenated. Preferably, steam will be present in an amount from about 2 to 30 mols per mol of organic compound to be dehydrogenated and excellent results have been obtained within the range of about 3 to about 25 mols of steam per mol of organic compound to be dehydrogenated. The functions of the steam are several-fold, and the steam may act as more than a diluent. Diluents generally may be used in the same quantities as specified for the steam.

The amount of oxygen fed to the reactor may vary depending upon the desired result such as conversion, selectivity and the number of hydrogen atoms being removed. Thus, to dehydrogenate butane to butene requires less oxygen than if the reaction proceeds to produce butadiene. Normally free oxygen will be present in the dehydrogenation zone in an amount from about 0.2 to 1.5, preferably 0.3 to 1.2, mols per mol of $H_2$ being liberated from the organic compound. Ordinarily the mols of free oxygen in the dehydrogenation zone will be in the range of from .2 to 2.01 or 2.5 mols per mol of organic compound to be dehydrogenated and for most dehydrogenations this will be within the range of .25 to 1.5 mols of oxygen per mol of organic compound. The predominant source of oxygen should be from the oxygen fed to the dehydrogenation zone with a preferred situation being that where at least 90 mol percent of the oxygen is supplied by this feed. The oxygen may be fed as oxygen, air, air enriched with oxygen, air plus diluents and so forth. The oxygen may be added in increments to various sections of the reactor.

It is one of the advantages of this invention that halogen may also be present in the reaction gases to give excellent results. The presence of halogen in the dehydrogenation zone is particularly effective when the compound to be dehydrogenated is saturated, such as a saturated hydrocarbon. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, methyl chloride, 1,2-dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; metal halides including molten halides; and the like. The halogen may be liberated partially or entirely by a solid source as disclosed in the process of U.S. 3,130,241 issued Apr. 21, 1964. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof. When terms such as halogen liberating materials or halogen materials are used in the specification and claims, this includes any source of halogen such as elemental halogens, hydrogen halides, or ammonium halides. The amount of halogen, calculated as elemental halogen, may be as little as about 0.0001 or less mol of halogen per mol of the organic compound to be dehydrogenated to as high as 0.2 or 0.5. The preferred range is up to 0.09 mol of halogen per mol of the organic compound to be dehydrogenated.

The temperature for the dehydrogenation reaction generally will be at least about 250° C., such as greater than about 300° C. or 375° C., and the maximum temperature in the reactor may be about 700° C. or 800° C. or perhaps higher such as 900° C. under certain circumstances. However, excellent results are obtained within the range of or about 350° C. to 700° C., such as from or about 400° C. to or about 675° C. The temperatures are measured at the maximum temperature in the dehydrogenation zone. An advantage of this invention is that lower temperatures of dehydrogenation may be utilized than are possible in conventional dehydrogenation processes. Another advantage is that large quantities of heat do not have to be added to the reaction.

The total pressure during dehydrogenation may be atmospheric, superatmospheric or subatmospheric. However, relatively low total pressures are entirely suitable, such as equal to or less than 100 p.s.i.g. When the total pressure of the reaction gases during dehydrogenation is one atmosphere or greater, the partial pressure of the organic compound to be dehydrogenated during dehydrogenation will desirably be no greater than one-third of the total pressure.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally, the flow rates will be within the range of about 0.10 to 25 liquid volumes of the organic compound to be dehydrogenated per volume of reactor containing catalyst per hour (referred to as LHSV), the volumes of organic compound being calculated at standard conditions of 25° C. and 760 mm. of mercury. Usually, the LHSV will be between 0.15 and about 5 or 10. For calculation, the volume of reactor containing catalyst is that volume of reactor space including the volume displaced by the catalyst. The gaseous hourly space velocity (GHSV) is the volume of the organic compound to be dehydrogenated in the form of vapor calculated under standard conditions of 25° C. and 760 mm. of mercury per volume of reactor space containing catalyst per hour. Generally, the GHSV will be between about 25 and 6400, and excellent results have been between about 38 and 3800. Suitable contact times are, for example, from about 0.001 or higher to about 5 or 10 seconds, with particularly good results being obtained between 0.01 and 3 seconds. The contact time is the calculated dwell time of the reaction mixture in the reaction zone, assuming the mols of product mixture are equivalent to the mols of feed mixture. For the purpose of calculation of residence times, the reaction zone is the portion of the reactor containing catalyst.

In the following examples will be found specific embodiments of the invention and details employed in the practice of the invention. Percent conversion refers to the mols of organic compound consumed per 100 mols of organic compound fed to the reactor, percent selectivity refers to the mols of product formed per 100 mols of organic compound consumed, and percent yield refers to the mols of product formed per mol of organic compound fed. All other percentages are by weight unless expressed otherwise.

The compositions of this invention have other uses such as for pigments and in particular for pigments useful for relatively high temperature applications.

EXAMPLE 1

Butene-2 is dehydrogenated to butadiene-1,3 utilizing a magnesium ferrite catalyst modified with boron and phosphorus. The run is performed in a 1 inch, I.D., 36 inches long, extremely heated Vycor[1] glass reactor. In the lower part of the reactor is placed plain Vycor Raschig rings about 1 inch high to support the catalyst bed. The catalyst bed on top of the Vycor ring is 4 inches high. Equimolar amounts of $H_3BO_3$ and $H_3PO_4$ are mixed and dried and 5 grams of the dried mixture are slurried in a Waring blendor in distilled water with 45 grams of magnesium ferrite (Columbian Carbon Company). The slurry was filtered and the filter cake cut in ⅛ x ⅛ x ⅛ inch pieces and dried at 105° C. To the reactor is fed n-butene-2 (C P grade) with oxygen and steam in a molar ratio of 0.6 mols of oxygen and 20 mols of steam steam per mol of n-butene. The flow rate is 1.0 liquid hourly space velocity (LHSV) of hydrocarbon. After the reaction had lined out and at a reactor temperature of 550° C. the conversion is 73 mol percent, the selectivity is 92 mol percent for a yield of 67 mol percent butadiene-1,3 per pass.

EXAMPLE 2

To illustrate the advantage of this invention, Example 1 is repeated using only the magnesium ferrite. Under identical conditions the selectivity is only 84 mol percent and the yield only 41 mol percent. With this catalyst somewhat better results are obtained at 600° C., but the selectivity is still only 87 percent for a yield of 52 percent.

EXAMPLE 3

Boron is incorporated in a magnesium ferrite catalyst

[1] Vycor is the trade name of Corning Glass Works; approximately 96 percent silica.

to give high yield and improved physical characteristics such as hardness in a low temperature process. The magnesium ferrite is modified with 10 percent by weight of $B_2O_3$ in intimate combination with the ferrite. The catalyst does not contain phosphorus. Butene-2, oxygen and steam are fed at molar ratios of 1.0, 0.75 and 30 respectively and the LHSV is 1.0. At a reactor temperature of 475° C. the conversion is 67 percent, the selectivity is 93 percent for a yield of 62 percent per pass.

EXAMPLE 4

Nickel ferrite is modified with boric acid in an amount of 10 percent by weight boric acid. The boric acid is intimately mixed with the reactants used to form the nickel ferrite. Thereafter the composition is heated at 900° C. for one hour to form the ferrite. Butene-2, oxygen and steam are fed to a reactor at the ratio of 1.0, 0.6 and 30 mols respectively. At a LHSV of 1.0 and a reactor temperature of 415° C. the conversion is 54 mol percent at a selectivity of 85 percent and a yield of 46 percent.

EXAMPLE 5

2-methylbutene-2 is dehydrogenated to isoprene. The catalyst contains a combination magnesium ferrite and zinc ferrite composition modified with boron. The magnesium ferrite is the same type used in the above examples. The zinc ferrite is Columbian Carbon Company type EG-2. The catalyst is prepared by mixing 5 weight percent of the zinc ferrite with 95 percent by weight of the magnesium ferrite in an aqueous slurry of distilled water. To this composition is added 4.0 percent by weight of $H_3BO_3$ (added as 10 percent $H_3BO_3$ aqueous solution) based on the total weight of the zinc ferrite and magnesium ferrite. After this composition has been thoroughly mixed, alumina carrier, type SA 5218, is added and the catalytic composition is coated on the carrier. The carrier particles were ³⁄₁₆ inch in diameter. After the catalyst is loaded into the reactor, hydrogen is passed through the reactor for about 2 hours with the catalyst temperature being about 500° C. 2-methylbutene-2 is dehydrogenated to isoprene at a flow rate of 1.0 liquid hourly space velocity, 0.63 mol of oxygen fed as air per mol of 2-methylbutene-2 and 15 mols of steam per mol of 2-methylbutene-2.

We claim:

1. As a composition of matter a ferrite of a metal selected from the group consisting of magnesium, manganese, cobalt, nickel, zinc, cadmium and mixtures modified with boron in an amount from .002 to 0.3 atom per atom of iron.

2. The composition of claim 1 wherein the boron is present in an amount from .02 to .20 atom per atom of iron.

References Cited

UNITED STATES PATENTS

| | | | |
|---|---|---|---|
| 1,771,130 | 7/1930 | Larson | 252—432 X |
| 2,326,800 | 8/1943 | Pier et al. | 252—432 X |
| 3,270,080 | 8/1966 | Christmann | 260—680 E |
| 3,284,536 | 11/1966 | Bajars et al. | 260—680 E X |
| 3,513,216 | 5/1970 | Woskow | 252—432 X |

PATRICK P. GARVIN, Primary Examiner

U.S. Cl. X.R.

260—680 (E), 696, 290, 465.9, 486, 604, 656, 668, 669, 678, 683.3